United States Patent [19]

Takenaka et al.

[11] Patent Number: 5,786,041
[45] Date of Patent: Jul. 28, 1998

[54] ALIGNMENT FILM, A METHOD FOR PRODUCING THE ALIGNMENT FILM AND A LIQUID CRYSTAL DISPLAY DEVICE USING THE ALIGNMENT FILM

[75] Inventors: Atsushi Takenaka, Machida; Kenichi Tajima, Moriyama; Hideo Takano, Atsugi, all of Japan; Shui-Chih A. Lien, Briarcliff Manor; Kang-Wook Lee, Yorktown Heights, both of N.Y.

[73] Assignee: International Business Machines Corporation, Armonk, N.Y.

[21] Appl. No.: 476,214

[22] Filed: Jun. 7, 1995

[51] Int. Cl.$^6$ .................................................. G02F 1/1337
[52] U.S. Cl. .................... 428/1; 156/242; 156/244.17; 156/246; 349/22; 349/34; 349/123; 349/125; 349/127; 349/134
[58] Field of Search ................................. 428/1; 427/77, 427/78, 240, 558; 359/75, 76, 77, 78; 156/242, 246, 244.17; 349/123, 125, 34, 22, 127, 134

[56] References Cited

U.S. PATENT DOCUMENTS

| | | | |
|---|---|---|---|
| 5,200,238 | 4/1993 | McArdle | 428/1 |
| 5,298,297 | 3/1994 | Takei | 428/1 |
| 5,298,590 | 3/1994 | Isogai | 428/1 |
| 5,498,762 | 3/1996 | Eguchi | 428/1 |
| 5,552,193 | 9/1996 | Asaoka | 428/1 |

*Primary Examiner*—Nasser Ahmad
*Attorney, Agent, or Firm*—Scully, Scott Murphy and Presser

[57] ABSTRACT

An alignment-film in which the pretilt angle is changed by ultraviolet irradiation, a material for forming the same, a liquid crystal display device using the alignment film, a method for producing an alignment-film formation material, and a method for producing an alignment film. Ultraviolet irradiation causes large changes in pretilt angle but few changes in electrical characteristics, and a liquid crystal display device free from deterioration of the liquid crystal, image sticking, or the occurrence of flicker results. A first polymer forms the underlying principal layer and a second polymer forms thereon a surface layer thinner than the principal layer. The first polymer may exhibit a small change in electrical characteristics due to ultraviolet radiation and the second polymer may exhibit a large change in pretilt angle due to ultraviolet radiation.

17 Claims, 4 Drawing Sheets

ALIGNMENT FILM, A METHOD FOR PRODUCING THE ALIGNMENT FILM AND A LIQUID CRYSTAL DISPLAY DEVICE USING THE ALIGNMENT FILM

CROSS-REFERENCE TO RELATED APPLICATION

The teaching of this invention may be applied to the structures taught in U.S. patent applications Ser. No. 08/194, 239 filed Feb. 10, 1994 of Lien et al. now U.S. Pat. No. 5,623,354 which is hereby incorporated by reference.

1. Field of the Invention

The invention relates to an alignment-film formation material, an alignment film using the same and a liquid crystal display device using the alignment film. More particularly, it relates to an alignment film in which the pretilt angle is changed by ultraviolet irradiation, a material for forming the same, a liquid crystal display device using the alignment film, a method for producing the alignment-film formation material, and a method for producing the alignment film.

2. Background Art

In recent years, liquid crystal display device has come to be used in a very wide variety of fields. With this trend, various requirements are put forth to improve the performance of liquid crystal displays in display devices. Obtaining a wide viewing cone is mentioned as one of the most important tasks to be accomplished.

In conventional liquid crystal display devices the contrast ratio, gradation, and displayed colors are subject to change depending on the viewing angle or direction.

Recently, as an approach to improvement in this dependency on the viewing angle, what is called a divided orientation technique is used. With this approach the orientation area in each pixel of a liquid crystal display device is divided into, for example, two different regions. The pretilt angles of the mutually opposed alignment films in each of the divided areas are asymmetrically set, and the pretilt angles of adjacent alignment films are asymmetrically set.

A liquid crystal display device using this conventional orientation divided method will be described referring to FIG. 1. FIG. 1 shows a partial sectional view of one pixel area in the liquid crystal display device.

On the glass substrate 2 of, for example, about 1 mm thickness, a display electrode 4 comprising indium tin oxide (ITO) of, for example, about 500 Å thickness, is formed. In turn, an alignment film 6 which provides an orientation and a predetermined pretilt angle of liquid crystal molecules 16 is formed on electrode 4.

A glass substrate 8 of, for example, about 1 mm thickness is provided a predetermined distance away and in opposed facing relationship to the alignment film 6 side of the glass substrate 2. On the side of glass substrate 8 facing glass substrate 2, an opposite electrode 10 comprising ITO of, for example, about 500 Å thickness, is formed. In turn, an alignment film 12 which provides an orientation and a predetermined pretilt angle of liquid crystal molecules 16 is formed on electrode 10. A polymer is used as a material of the alignment films 6 and 12. In the region between the alignment films 6 and 12, liquid crystal material is hermetically enclosed to make up a liquid crystal layer 14.

In FIG. 1, the alignment film 6 comprises two side-by-side regions 18 and 22 different in pretilt angle, bordered by an orientation dividing line 26 at substantially the center of the pixel area.

Similarly, the alignment film 12 also comprises two side-by-side regions 20 and 24 different in pretilt angle, bordered by an orientation dividing line 28 almost at the center of the pixel area.

In FIG. 1, liquid crystal molecules 16 in the liquid crystal layer 14 to the left of the pixel area tilts, for example, clockwise at a pretilt angle of a1 in the region 18 of the alignment film 6 and tilt counterclockwise at a pretilt angle a2 (<a1) is the region 20 of the opposed alignment film 12. On the other hand, liquid crystal molecules 16 in the liquid crystal layer 14 to the right of the pixel area tilt clockwise at a pretilt angle of a2 is the region 22 of the alignment film 6 and tilt counterclockwise at a pretilt angle a1 in the region 24 of the opposed alignment film 12.

In the left half of a pixel, the direction of the tilt in a large pretilt angle region 18 is leading and accordingly on application of voltage between both electrodes 4 and 10, liquid crystal molecules 16 rise toward the left. In the right half of the pixel, the direction of the tilt in a large pretilt angle region 24 is leading and accordingly on application of voltage between electrodes 4 and 10, liquid crystal molecules 16 rise toward the right. In this way, two regions different in the direction of tilt are implemented. Since the directions of good visual range with respect to both gradation and contrast are mutually opposed in these two areas, a complementally symmetric characteristic as a function of viewing angle can be obtained.

To make the angle of tilt vary between individual regions or areas in a pixel, there is also a tilt angle diversification method wherein certain types of polymers are formed in the regions 18 to 24 of the alignment films 6 and 12, which yield different angles of tilt. However, attention has recently been paid to a tilt angle diversification method implanted by irradiating with ultraviolet rays, for example, on the regions 20 and 22 in which it is desired to make the pretilt angle small and changing the surface conditions in the relevant area (UV method). FIG. 2 shows a typical structure of this alignment film using a single polymer. An alignment film 40 consisting of one kind of polymer 32 is applied to the glass substrate 30.

However, according to this UV method, an ultraviolet irradiated alignment film consisting of a single polymer changes not only in pretilt angle but also in electrical properties of the alignment film itself. Consequently, using this UV method brings about not only asymmetry of pretilt angles, but also electrical asymmetry in a set of alignment films bordered by the liquid crystal layer.

Generally, if DC voltage continues to be applied to liquid crystals, they deteriorate. Accordingly, AC driving voltage is applied to liquid crystals. However, because of electrical asymmetry between alignment films caused by ultraviolet irradiation, an internal DC bias voltage occurs with continued use of a liquid crystal display device. This internal DC bias voltage superimposed on the AC driving voltage acts as a DC offset component and thus causes the liquid crystal material to deteriorate and may further cause images to stick or flicker.

Thus, in order to use the UV method, an alignment film is desired wherein ultraviolet irradiation causes a change in pretilt angle but no change in electrical characteristics. At present, no such conventional alignment film consisting of a single polymer has been synthesized which satisfies these requirements.

SUMMARY OF THE INVENTION

It is one object of the present invention to provide an alignment-film formation material in which ultraviolet irradiation causes sufficient changes in pretilt angle but minimal changes in electrical characteristics.

It is another object of the invention to provide a method for producing such an alignment film material.

It is yet another object of the present invention to provide an alignment film in which ultraviolet irradiation causes sufficient change in pretilt angle but minimal change in electrical characteristics.

It is still another object of the invention to provide a method for producing such an alignment film.

It is further object of the present invention to provide a liquid crystal display device free from deterioration of liquid crystal material, pixel burning stains, and the occurrence of flicker.

The above objects are achieved using a material for the formation of an alignment film to orient liquid crystals in a predetermined direction wherein two polymers are mixed so as to form a predetermined concentration distribution in the direction of film thickness.

The two polymers consist of a first polymer forming the underlying principal layer, and a second polymer thereupon forming the surface layer, the second layer being thinner than the principal layer.

The first polymer, which may undergo a small change in electrical characteristics due to ultraviolet irradiation, may consist of aromatic containing materials.

The second polymer, which may undergo a large change in pretilt angle due to ultraviolet irradiation, may consist of ultraviolet-sensitive functional groups such as cyclobutane.

The above objects may be achieved by using an alignment film formation material formed by mixing a first polymer having a low sensitivity to change in electrical properties when irradiated with ultraviolet radiation (which may have a higher molecular weight) with a second polymer having a high sensitivity to change in pretilt angle when irradiated with ultraviolet radiation (and which may have a lower molecular weight).

Furthermore, the above objects may be achieved using an alignment film formation material formed by mixing a first polymer having a higher polarity and a low sensitivity to change in electrical properties when irradiated by ultraviolet radiation with a second polymer having a lower polarity and a high sensitivity of pretilt angle change when irradiated by ultraviolet radiation.

Still further, the above objects are achieved using an alignment film formation material formed by mixing a first polymer having a higher polarity as well as a low sensitivity to change in electrical properties due to ultraviolet radiation (which may have a higher molecular weight) with a second polymer having a lower polarity as well as a high sensitivity to pretilt angle change due to ultraviolet radiation (which may have a lower molecular weight).

The above objects are also achieved using the alignment-film formation material wherein the second polymer is mixed with the first polymer in a ratio of less than 50%.

The above objects may also be achieved using the alignment-film formation material wherein the mixture ratio of the first polymer to the second polymer is substantially 9:1.

The above objects are achieved using an alignment film to orient liquid crystals in a predetermined direction wherein changes in response to ultraviolet irradiation are large with respect to pretilt angle and small with respect to electrical characteristics.

In accordance with the invention a principal layer of the alignment film exhibits a small change in electrical charac-teristics in response to ultraviolet irradiation and a surface layer exhibits a large change in pretilt angle in response to ultraviolet irradiation.

The above objects are achieved using a liquid crystal display device comprising: two substrates in facing relationship a predetermined distance apart from each other; respective alignment films formed on the mutually opposing faces of the two substrates; and a liquid crystal layer enclosed hermetically between the substrates; wherein the alignment films are those described above.

The above objects are also achieved by a method for producing an alignment-film formation material wherein a first polymer having a low sensitivity to change in electrical properties when irradiated by ultraviolet radiation (which may be of high molecular weight) is mixed with a second polymer having a high sensitivity to change in pretilt angle when exposed to ultraviolet radiation (which may be of low molecular weight).

The above objects may also be achieved by a method for producing an alignment-film formation material wherein a first polymer having a higher polarity and a sensitivity to change in electrical properties when irradiated by ultraviolet radiation is mixed with a second polymer having a lower polarity and a high sensitivity to change in pretilt angle when irradiated by ultraviolet radiation.

The above objects are achieved by a method for producing an alignment-film formation material wherein a first polymer having a higher polarity as well as low sensitivity to change in electrical properties when exposed to ultraviolet radiation (which may have a high molecular weight) is mixed with a second polymer having a lower polarity as well as a high sensitivity to change in pretilt angle when exposed to ultraviolet radiation (which may be of lower molecular weight).

The above objects are achieved by a method for producing an alignment-film formation material wherein the principal layer is formed by spreading a first polymer low in sensitivity to change in electrical properties when exposed to ultraviolet radiation and a surface layer, which is thinner than the principal layer, is formed on the principal layer by spreading a second polymer having a high sensitivity to change in pretilt angle when exposed to ultraviolet radiation.

Furthermore, the above objects are achieved by a method for producing an alignment film wherein a first polymer having a larger molecular weight and a low sensitivity of change in electrical properties when exposed to ultraviolet radiation is mixed with a second polymer having a smaller molecular weight and a high sensitivity of change in pretilt angle when exposed to ultraviolet radiation and the mixture is dissolved in a solvent to make a polymer solution. Then a thin surface layer of the second polymer having a smaller molecular weight is formed on the first polymer layer when the solution is applied onto the substrate and the solvent is evaporated away.

Still further, the above objects are achieved by a method for producing an alignment film wherein a first polymer having a higher polarity and a low sensitivity to change in electrical properties when exposed to ultraviolet radiation and a second polymer having a lower polarity and a high sensitivity to change in pretilt angle when exposed to ultraviolet radiation are mixed and dissolved in a solvent to make a polymer solution. A thin surface layer of the second polymer having a lower polarity is formed on the first polymer layer when the solution is applied onto the substrate and the solvent is evaporated away.

Yet further, the above objects are achieved by a method for producing an alignment film wherein a first polymer having a larger molecular weight and a higher polarity as well as low sensitivity to change in electrical properties when exposed to ultraviolet radiation, and a second polymer having a lower molecular weight and a lower polarity as well as a high sensitivity to change in pretilt angle when exposed to ultraviolet radiation are mixed and dissolved in a solvent to make a polymer solution. A thin surface layer of the second polymer having a lower molecular weight and polarity is formed on the first polymer layer when the solution is applied onto the substrate and the solvent evaporates away.

It is indispensable to an alignment film using the UV method that ultraviolet irradiation brings about a sufficient change in pretilt angle but little change in electrical characteristics. However, a general alignment film consisting of a single polymer has contradictory properties in that raising sensitivity of changes in pretilt angle to ultraviolet radiation leads to an increased change in electrical characteristics, while suppressing a change in electrical characteristics results in a drop in sensitivity of pretilt angle change to ultraviolet radiation.

Thus, to implement a wide viewing cone liquid crystal display device, an alignment film must be produced which is high in sensitivity of change in pretilt angle and low in sensitivity of electrical characteristics when the film is exposed to ultraviolet radiation.

According to the present invention, two polymers to be separated from each other in the direction of film thickness upon the formation of an alignment film are mixed: a first polymer forms the underlying principal layer and a second polymer thereupon forms as a surface layer thinner than the principal layer. Because the first polymer exhibits a small change in electrical characteristics due to ultraviolet irradiation and the second polymer exhibits a large change in pretilt angle due to ultraviolet irradiation, a liquid crystal display device free from deterioration of liquid crystal material, or image sticking, or occurrence of flicker can be produced.

DETAILED DESCRIPTION OF THE PREFERRED EMBODIMENTS

An alignment-film formation material and alignment film according to one embodiment of the present invention will be described. The alignment-film formation material in the present embodiment is made by mixing a polymer of high polarity and low in sensitivity to change in electrical characteristics (which may be of high molecular weight) with a small amount (more than several percent and below 50%) of a polymer of lower polarity and high in sensitivity to change in pretilt angle when exposed to ultraviolet radiation (which may be of lower molecular weight).

There are cyclobutane containing materials formed as polymers exhibiting a high sensitivity to change in pretilt angle upon exposure to ultraviolet energy and aromatic containing materials formed as polymers exhibiting a low sensitivity to change in electrical characteristics upon exposure to ultraviolet radiation. On applying such alignment film formation materials to a substrate, the polymer of lower polarity (which may be of lower molecular weight) migrates to the surface and forms a thin surface layer, until the solvent is evaporated away. The solvent may be n-methylpyrripinone also known as 1-methyl-2-pyrrolipinone or NMP, but may also contain GBL and butylcellulose.

Figure 1:
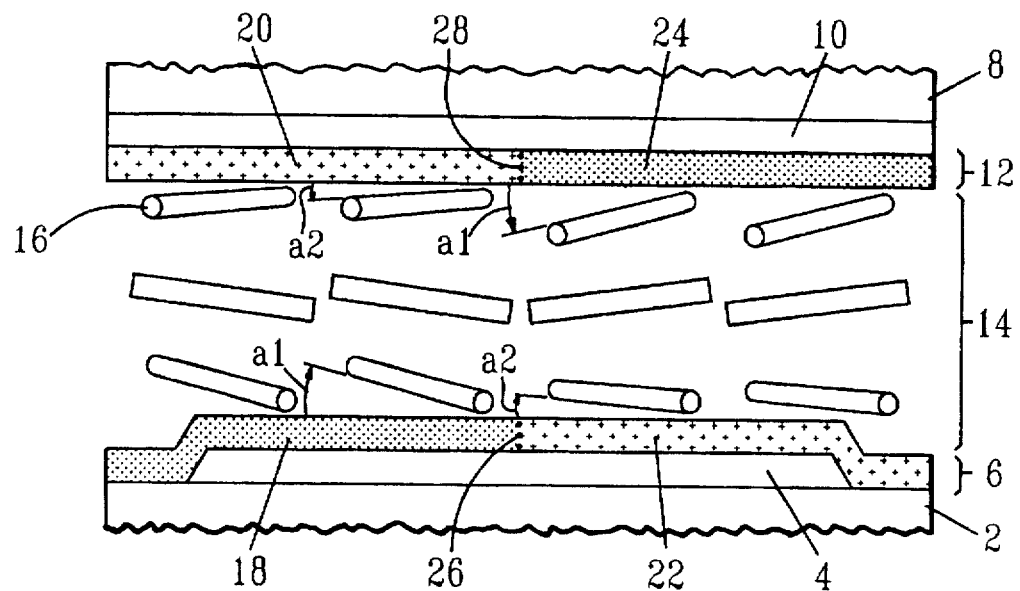
FIG. 1 is an enlarged somewhat schematic cross-sectional view illustrating the structure of a liquid crystal display device.
Figure 2:
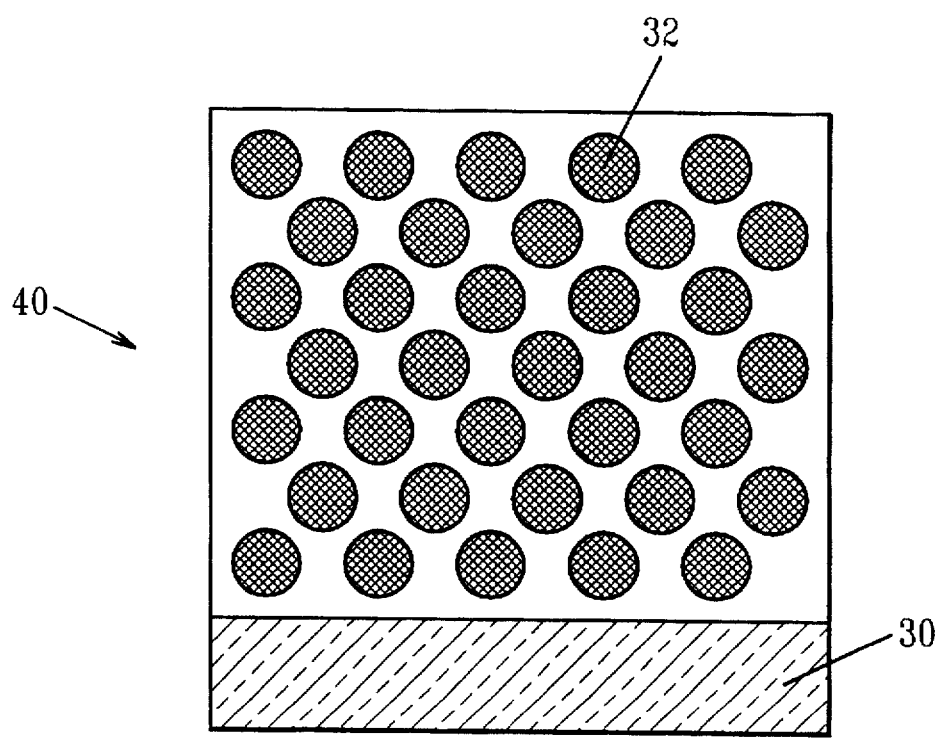
FIG. 2 illustrates the typical structure of a conventional alignment film.
Figure 3:
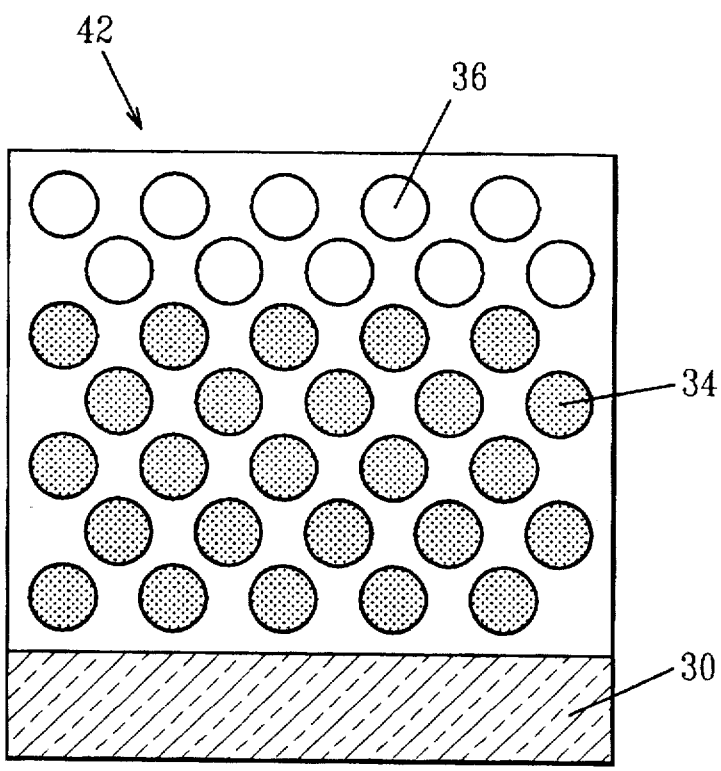
FIG. 3 illustrates the typical structure of an alignment film according to one embodiment of the present invention.
Figure 4:
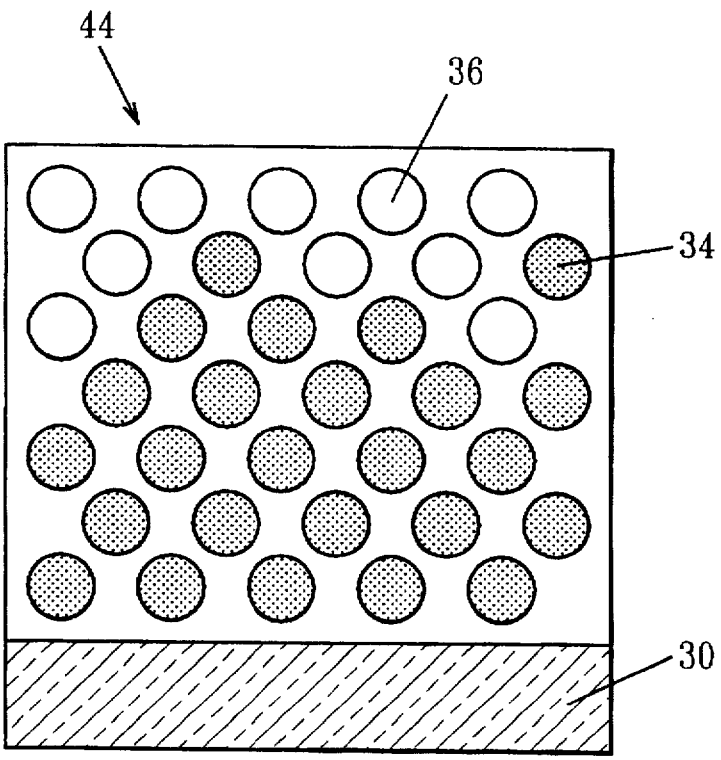
FIG. 4 illustrates the typical structure of another alignment film according to one embodiment of the present invention.

FIGS. 3 and 4 represent this situation. The principal and surface layers are formed in such a laminated state as shown in either figure, or the principal layer and the surface layer are not definitely separated as layers and two polymers are mixed so as to form a predetermined concentration distribution in the direction of film thickness upon the formation of an alignment film.

FIG. 3 shows an alignment film 42 in which a polymer layer 34 forming the thicker principal layer is formed on the glass substrate 30 and another polymer layer 36 forming a thin surface layer is formed on it.

The alignment film 44 shown in FIG. 4 has a polymer layer 34 forming the thicker principal layer formed on the glass substrate 30 and another polymer layer 36 forming the thin surface layer formed via a mixed area of the principal and surface polymer layers 34 and 36.

A cyclobutane polymer (Nissan Chemical Industries, Ltd. SE7210) may be employed for the surface layer (a low polarity material having high sensitivity of changes in pretilt angle). If used alone, SE7210 is a material having a sufficient sensitivity to changes in pretilt angle upon exposure to ultraviolet radiation but, at the same time, develops a large internal DC bias voltage. The pretilt angle for SE7210 is about 5° before ultraviolet irradiation but can be changed to less than 2° but preferably less than 1° by irradiating with a predetermined amount of ultraviolet rays.

SE7690 made by Nissan Chemical Industries, Ltd. may be used as the principal layer, since it is a high polarity material with a low sensitivity of electrical characteristics upon exposure to ultraviolet radiation. If used alone, SE7690 is a material having almost no sensitivity of pretilt angle to ultraviolet energy, but also develops almost no internal DC bias voltage.

Figure 5:
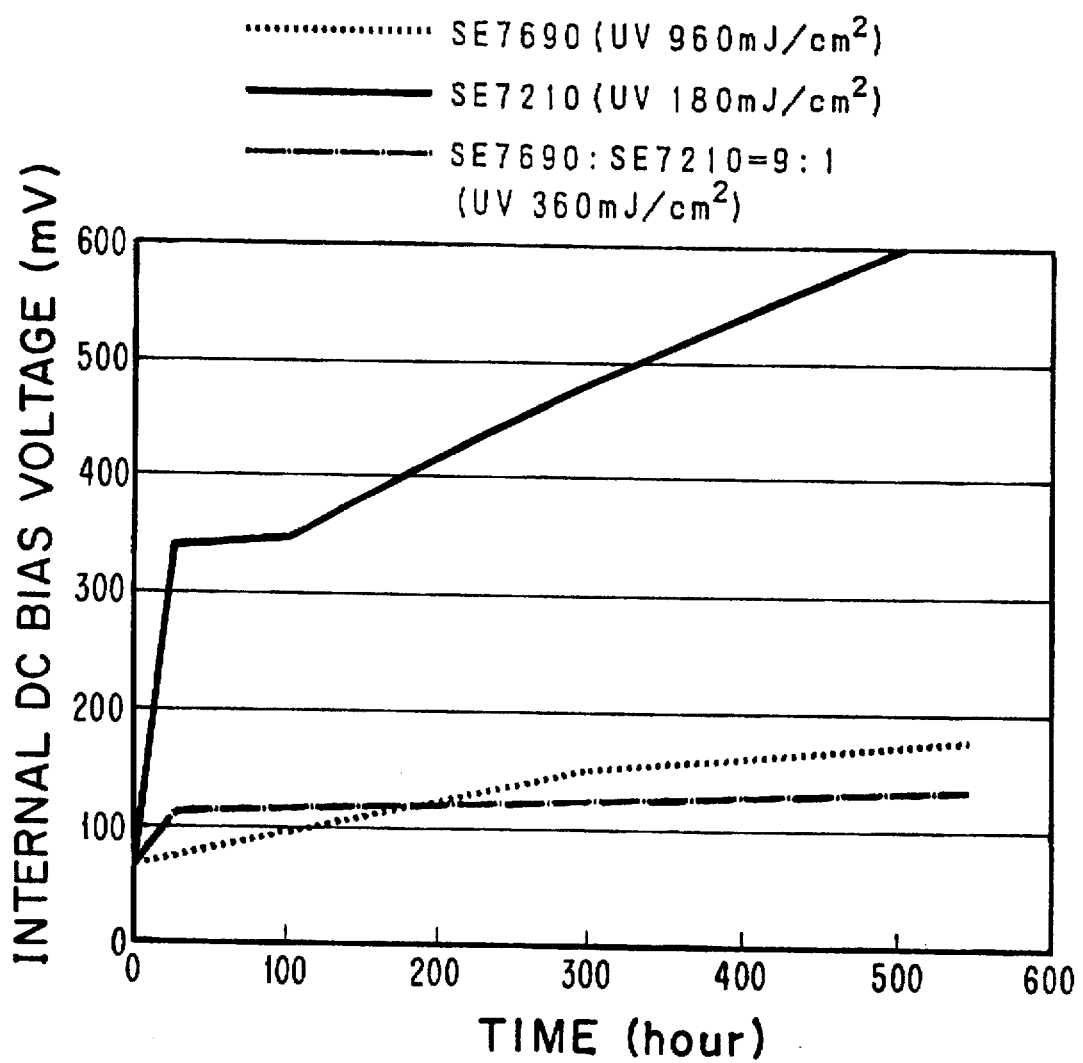
FIG. 5 illustrates the relationship between the internal DC bias voltage and time.

FIG. 5 shows the changing behavior of the internal DC voltage in a liquid crystal display device having the respective alignment films formed by using two polymers, SE7210 and SE7690 singly as alignment-film formation materials. In FIG. 5, the ordinate and abscissa indicate respectively an internal DC bias voltage (mV) and a time during which the voltage for driving the liquid crystal display device continues to be applied.

As shown in FIG. 5, a liquid crystal display having an alignment film formed of SE7210 that was irradiated at a dosage of 180 mJ/cm2 with ultraviolet rays undergoes increases in the internal DC bias voltage which go even higher as the duration of driving of the liquid crystal increases. An alignment film formed of SE7690, which is low in sensitivity of the pretilt angle change to ultraviolet radiation, which was irradiated at a dosage of 960 mJ/cm2 with ultraviolet rays, does not exhibit as much change in internal DC bias voltage and maintains a low voltage. The ultraviolet radiation should be in the deep UV range and should have a wavelength of between 180 and 300 nanometers. Preferably, the 254 nanometer peak of the mercury spectrum may be used.

Figure 6:
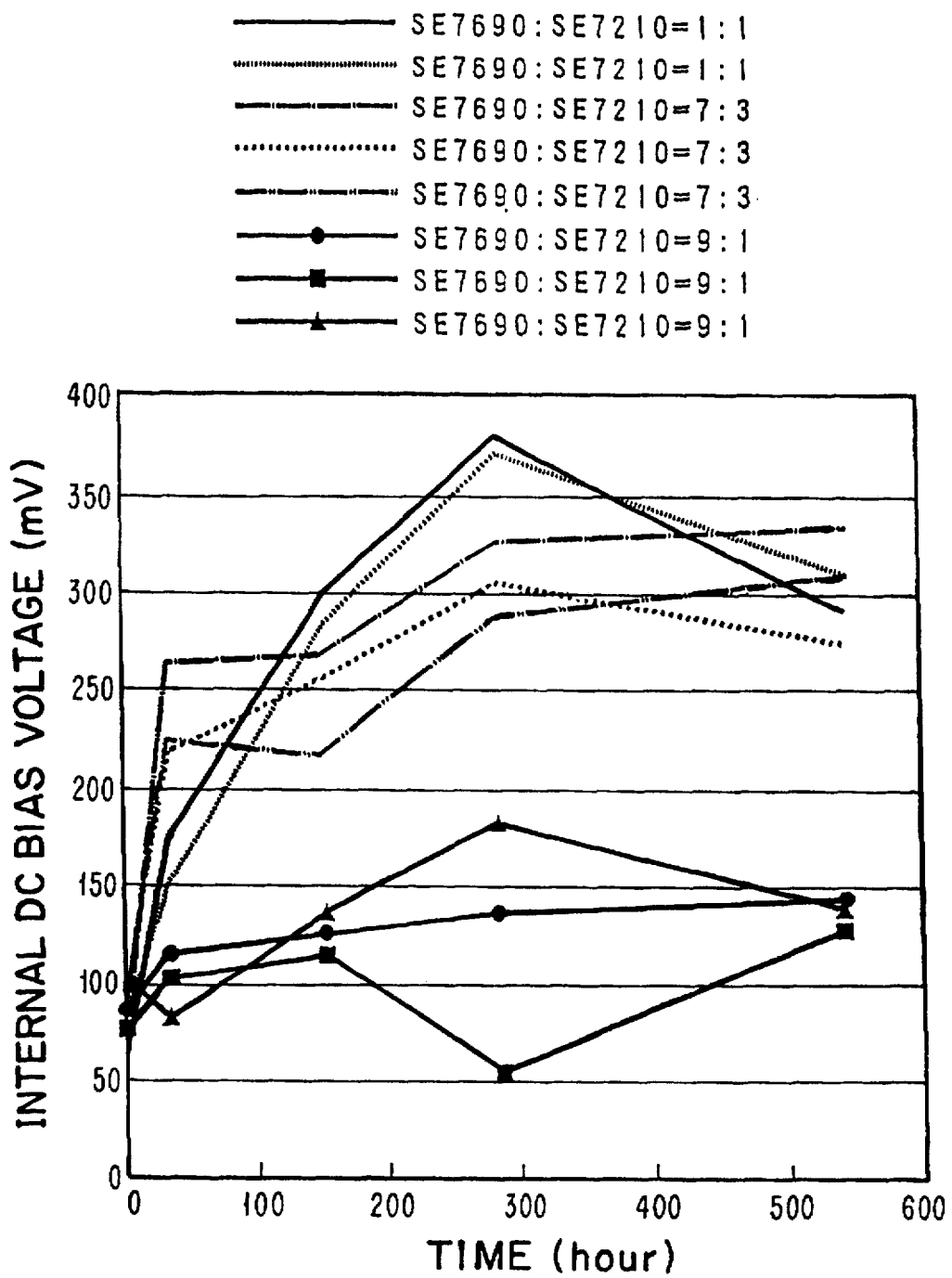
FIG. 6 illustrates the relationship between the internal DC bias voltage and time.

These polymers are mixed at SE7690/SE7210 weight ratios of 1:1 to 9.75:0.25 for experiments. FIG. 6 shows temporal variations of the internal DC bias voltage dependent on a change in the ratio of mixing. FIG. 6 relates to the respective alignment films formed by applying mixtures of various weight ratios of the two types (SE7690 and SE7210) of polymers to the substrate, evaporating the solvent away, and irradiating with ultraviolet rays thereafter.

In FIG. 6, there are a plurality of data for one and the same mixture ratio, but these data are made up under different ultraviolet irradiation conditions. The comparison with FIG. 3 reveals that the alignment-film formation material formed at any of the mixture ratios gives a lower internal DC bias voltage than that of the alignment film formed of a single polymer of SE7210. This is independent of the irradiation conditions of the ultraviolet rays. With regard to changing the pretilt angle, it is found that the mixed alignment film undergoes a change as great as the pretilt angle change of an alignment film formed of a single polymer (SE7210).

As seen from FIG. 6, the mixture ratio of 9:1 is best for suppressing the internal DC bias voltage. As seen from FIG. 5, the internal DC bias voltage can be reduced to ¼ or less then that with the simple polymer of SE7210 and to much the same extent as with SE7690. In addition, the pretilt angle can be changed sufficiently for use in a display by the action of SE7210 in the surface layer.

As described above, according to the present invention, since such an alignment film is easy to form, enables a large change in pretilt angle to be obtained and suppresses the internal DC bias voltage, a wide viewing cone liquid crystal display device becomes producible.

The present invention is not limited to the above embodiment and can be modified in various ways.

Another pair of polymers which may be used are Nissan SE5291 and Dupont PI5878. The first is a relatively non-polar and ultraviolet sensitive material which is pre-imidized. The second is a PMDA-ODA polyamic acid which provides a polar film surface. When processed as outlined above, the SE5291 forms a thin surface layer over the PI5878 which forms the principal layer. It is believed that the materials separate in this way because the SE5291 has a lower surface energy than the PI5878. The materials are mixed in ratios comparable to those discussed above. The solvent may include gamma-butyrolactane (GBL).

While two polymers different in both molecular weight and polarity have been used in the above embodiment, it is to be understood that the present invention is not limited thereto. For example, by using a mixture composed of a polymer solution of a polymer low in sensitivity of electrical characteristics to ultraviolet radiation (which may be of high molecular weight) and a small amount of a polymer solution high in sensitivity of change in pretilt angle to ultraviolet radiation (which may be lower in molecular weight), advantages similar to those of the above embodiment can also be obtained. On applying an alignment film formation material composed of two polymers different in molecular weight to the substrate, a polymer lower in molecular weight migrates to the surface and forms a thin surface layer when the solvent is evaporated away.

Also, using an alignment-film formation material made by mixing a small amount of polymer solution lower in polarity and high in sensitivity of change in pretilt angle on exposure to ultraviolet radiation with a polymer solution higher in polarity and low in sensitivity of electrical characteristics to ultraviolet radiation, advantages similar to those of the above embodiment can also be obtained. On applying an alignment film formation material composed of two polymers different in polarity from the substrate, the polymer of lower polarity migrates to the surface and forms a thin surface layer when the solvent is evaporated away.

In addition, although the production process becomes more complicated, two types of alignment layers in a two-layer structure may be formed by first spreading a polymer low in sensitivity of electrical characteristics upon exposure to ultraviolet radiation on the substrate and spreading a polymer high in sensitivity to change in pretilt angle on exposure to ultraviolet radiation thereon.

As described above, according to the present invention, an alignment-film formation material can be produced in which the pretilt angle changes enough but the electrical characteristics do not change much in response to ultraviolet irradiation and a liquid crystal display device free from deterioration of the liquid crystal material, image stickings, and the occurrence of flicker can be produced.

What is claimed is:

1. An alignment film formed by the steps which comprise mixing together a first polymer and a second polymer, said first polymer less sensitive to change in electrical properties when exposed to ultraviolet radiation than said second polymer, in a common solvent such that a solution is formed; casting said solution on a substrate; heating said solution such that a solid film is formed; and exposing only a portion of said film to ultraviolet radiation such that a cured film having a first surface and a second surface is formed wherein said film has a high sensitivity to pretilt angle and a lower internal DC bias voltage than films formed of either said first or said second polymers.

2. A film in accordance with claim 1 wherein said first polymer has a higher molecular weight than said second polymer.

3. A film in accordance with claim 1 wherein said first polymer has a higher polarity than said second polymer.

4. A film in accordance with claim 1 wherein said first and said second polymers are present in a concentration such that said second polymer represents less than 50% by weight of the total weight of said first and said second polymers.

5. A film in accordance with claim 4 wherein said first and said second polymers are combined in a common solvent in a weight ratio of substantially 9:1.

6. A process for producing an alignment film comprising mixing together a first polymer and a second polymer, said first polymer less sensitive to change in electrical properties when exposed to ultraviolet radiation than said second polymer, in a common solvent such that a solution is formed; casting said solution on a substrate; heating said solution such that a solid film is formed thereby forming a cured polymer alignment film having a high sensitivity to pretilt angle and a lower internal DC bias voltage than films formed of either of said first or said second polymers; and exposing a portion of said film to ultraviolet radiation.

7. A process in accordance with claim 6 wherein said first polymer includes aromatics.

8. A process in accordance with claim 6 wherein said second polymer exhibits a large change in pre-tilt angle upon exposure to ultraviolet radiation.

9. A process in accordance with claim 6 wherein said second polymer contains cyclobutanes.

10. A process in accordance with claim 6 wherein said first polymer has a higher molecular weight than said second polymer.

11. A process in accordance with claim 6 wherein said first polymer has a higher polarity than said second polymer.

12. A process in accordance with claim 6 wherein said first and said second polymers are present in a concentration such that said second polymer is present in an amount of less than 50% by weight, based on the total weight of said first and said second polymers.

13. A process in accordance with claim 6 wherein said first and said second polymers are combined in said common solvent in a weight ratio of substantially 9:1.

14. An alignment film as set forth in claim 1 wherein said first film polymer contains aromatics.

15. An alignment film as set forth in claim 1 wherein said second polymer exhibits a large change in pretilt angle upon exposure to ultraviolet radiation.

16. An alignment film as set forth in claim 1 wherein said second polymer contains cyclobutanes.

17. A liquid crystal display device comprising two substrates facing one another with a predetermined space therebetween; a pair of alignment films, said alignment films formed in accordance with claim 1 disposed on mutually opposing faces of two substrates wherein said second surface of said alignment films are disposed on said substrates; and a liquid crystal layer hermetically enclosed between said substrates.

* * * * *